(12) United States Patent
Li (10) Patent No.: US 11,070,246 B2
(45) Date of Patent: Jul. 20, 2021

(54) DIGITAL RADIO COMMUNICATION (71) Applicant: Nordic Semiconductor ASA, Trondheim (NO)

(72) Inventor: Wei Li, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 0 days.

(21) Appl. No.: 16/466,624

(22) PCT Filed: Dec. 1, 2017

(86) PCT No.: PCT/GB2017/053630
§ 371 (c)(1),
(2) Date: Jun. 4, 2019

(87) PCT Pub. No.: WO2018/104708
PCT Pub. Date: Jun. 14, 2018

(65) Prior Publication Data
US 2019/0349021 A1 Nov. 14, 2019

(30) Foreign Application Priority Data
Dec. 5, 2016 (GB) ...................... 1620669

(51) Int. Cl.
*H04B 1/7075* (2011.01)
*H04B 17/20* (2015.01)
*H04B 1/16* (2006.01)

(52) U.S. Cl.
CPC ........... *H04B 1/70755* (2013.01); *H04B 1/16* (2013.01); *H04B 17/20* (2015.01)

(58) Field of Classification Search
CPC ....... H04B 1/16; H04B 1/70755; H04B 17/20
See application file for complete search history.

(56) References Cited

U.S. PATENT DOCUMENTS 4,538,281 A * 8/1985 Rajan ...................... H04B 1/69
370/342
5,629,639 A * 5/1997 Williams ............. H03K 5/1532
327/58
(Continued)

FOREIGN PATENT DOCUMENTS

CN 102571136 A 7/2012
CN 102901953 A 1/2013
(Continued)

OTHER PUBLICATIONS

International Search Report and Written Opinion for PCT/GB2017/053630, dated Mar. 12, 2018, 14 pages.
(Continued)

*Primary Examiner* — David B Lugo
(74) *Attorney, Agent, or Firm* — Klarquist Sparkman, LLP (57) ABSTRACT

A method of operating a digital radio receiver comprising: receiving a radio signal; passing said radio signal to a correlator for correlating said radio signal with a predetermined pattern to provide an output signal comprising a plurality of peaks separated in time; determining an amplitude of a first peak in the plurality of peaks; calculating a selection threshold based on said first peak amplitude; determining an amplitude of a second peak in the plurality of peaks; comparing said second peak amplitude to the selection threshold; and identifying the second peak as a correlation peak if the second peak amplitude is greater than the selection threshold.

23 Claims, 5 Drawing Sheets

(56) References Cited

U.S. PATENT DOCUMENTS

| | | | |
|---|---|---|---|
| 7,023,831 B2 | 4/2006 | Okuyama | |
| 7,643,537 B1* | 1/2010 | Giallorenzi | H04B 1/7093 |
| | | | 375/142 |
| 2004/0228268 A1 | 11/2004 | McDonough et al. | |
| 2006/0014494 A1* | 1/2006 | Vanderperren | H04L 27/2675 |
| | | | 455/63.1 |
| 2006/0165197 A1 | 7/2006 | Morita et al. | |
| 2007/0189366 A1* | 8/2007 | Ryu | H04B 1/7117 |
| | | | 375/148 |
| 2009/0129449 A1 | 5/2009 | Gobara | |
| 2012/0300755 A1* | 11/2012 | Ancora | H04B 1/70755 |
| | | | 370/336 |
| 2016/0087742 A1 | 3/2016 | Zinevich | |
| 2016/0315694 A1 | 10/2016 | Maiya et al. | |
| 2018/0367184 A1 | 12/2018 | Olsen et al. | |

FOREIGN PATENT DOCUMENTS

| | | |
|---|---|---|
| CN | 103441830 A | 12/2013 |
| EP | 2328286 | 6/2011 |
| JP | H04124926 | 4/1992 |
| JP | H11196026 | 7/1999 |
| JP | 2007267132 | 10/2007 |
| WO | WO2005/048479 | 5/2005 |
| WO | WO2012/173607 | 12/2012 |
| WO | WO2014/167318 | 10/2014 |
| WO | WO2015/189584 | 12/2015 |

OTHER PUBLICATIONS

Search Report under Section 17(5) for GB1620669.0, dated Aug. 25, 2017, 4 pages.

* cited by examiner

DIGITAL RADIO COMMUNICATION

CROSS REFERENCE TO RELATED APPLICATIONS

This is the U.S. National Stage of International Application No. PCT/GB2017/053630, filed Dec. 1, 2017, which was published in English under PCT Article 21(2), which in turn claims the benefit of Great Britain Application No. 1620669.0, filed Dec. 5, 2016.

The present invention relates to methods and apparatus for demodulating digital radio signals using correlators. More particularly, but not exclusively, the present invention relates to methods and apparatus for identifying a correlation peak in a received output signal from a correlator for use in operations such as symbol timing recovery and frame synchronisation in radio communications.

Various radio communication systems are known for transmitting binary message data. Examples include Bluetooth™ and Bluetooth Low Energy™. It is important for a digital radio receiver to determine timing synchronization quickly and accurately from a received data packet (also called a data frame), in order to be able to decode the message data reliably. It is known to include a predetermined synchronization word, known to both the transmitter and the receiver, near the beginning of each frame, which the receiver can use to perform operations such as symbol timing recovery, frame synchronization, frequency offset compensation, and Automatic Gain Control (AGC) training, before the receiver decodes the message data from the frame.

When a received radio signal is weak, it can be harder for the receiver to perform these operations reliably. In WO2015189584A1, which is incorporated herein by reference, the present applicant previously contemplated including in a data packet a synchronization word consisting of two or more identical synchronization sequences to provide for more accurate symbol timing recovery, frame synchronization, and frequency offset compensation. This approach allows the receiver to use a relatively-short correlator which correlates the incoming signal repeatedly against one instance of the stored synchronization sequence. This is more power efficient than correlating against a longer, non-repeating synchronization sequence. A synchronization circuit/processor can use the distance in time between successive correlator matches (for the successive synchronization sequences) to obtain symbol timing recovery, in addition to the basic match metric of correlator output amplitude.

A shortcoming of the above technique is that, in addition to the correlation peaks that usually arise when a stored synchronization sequence in the correlator matches a synchronization sequence in a received data packet, the correlation function produces sidelobe peaks. Sidelobe peaks typically arise when the correlator only matches some of its stored synchronization sequence with a synchronization sequence in a received packet, rather than matching most or all of the stored synchronization sequence. Whilst sidelobe peaks are lower in amplitude than full correlation peaks, their amplitude can nonetheless be significant which can make it difficult to distinguish them from full peaks, particularly in noisy environments.

As alluded to above, a further difficulty faced by correlators is that noise in the received data packet may give rise to noise peaks in the correlation output. Sidelobe peaks and noise peaks are undesirable as they make it difficult to identify the correlation peaks accurately for operations such as symbol timing recovery and frame synchronization.

To distinguish a correlation peak from false peaks (e.g. sidelobe peaks and noise peaks) in the correlator output, a synchronization circuit can use a threshold for determining whether or not a correlation peak (i.e. correlation match) has been found. Such techniques rely on the correlation peaks having amplitudes greater than the sidelobe peaks and the noise peaks. In general, it is desirable to keep the threshold as low as possible (e.g. <0.6 for a normalised correlator output) because the sensitivity of the receiver decreases with increasing threshold. However, this is not always possible because in some cases, such as when the received data packet has a high signal-to-noise ratio, the sidelobe peaks may have comparable amplitudes to the correlation peaks. As a consequence a high threshold may be required to identify some of the correlation peaks. Unfortunately, however, some of the correlation peaks may not have amplitudes that exceed the threshold and, as a result, the synchronization circuit may not be able to detect those correlation peaks. If not enough correlation peaks are identified, the synchronization circuit may not be able to perform operations such as symbol timing recovery and frame synchronization because such operations usually require a minimum number of correlation peaks to be identified.

From a first aspect, the invention provides a method of operating a digital radio receiver comprising;
  receiving a radio signal;
  passing said radio signal to a correlator for correlating said radio signal with a predetermined pattern to provide an output signal comprising a plurality of peaks separated in time;
  determining an amplitude of a first peak in the plurality of peaks;
  calculating a selection threshold based on said first peak amplitude;
  determining an amplitude of a second peak in the plurality of peaks;
  comparing said second peak amplitude to the selection threshold; and
  identifying the second peak as a correlation peak if the second peak amplitude is greater than the selection threshold.

The invention extends to an apparatus a comprising a digital radio receiver for receiving a radio signal and arranged to:
  pass said radio signal to a correlator for correlating said radio signal with a predetermined pattern to provide an output signal comprising a plurality of peaks separated in time;
  determine an amplitude of a first peak in the plurality of peaks;
  calculate a selection threshold based on said first peak amplitude;
  determine an amplitude of a second peak in the plurality of peaks;
  compare said second peak amplitude to the selection threshold; and
  identify the second peak as a correlation peak if the second peak amplitude is greater than the selection threshold.

The invention further extends to a non-transitory computer readable medium comprising software adapted when run on a data processing apparatus to:
  receive a radio signal from a digital radio receiver;
  correlate said radio signal with a predetermined pattern to provide an output signal comprising a plurality of peaks separated in time;

determine an amplitude of a first peak in the plurality of peaks;

calculate a selection threshold based on said first peak amplitude;

determine an amplitude of a second peak in the plurality of peaks;

compare said second peak amplitude to the selection threshold; and identify the second peak as a correlation peak if the second peak amplitude is greater than the selection threshold.

Thus it will be seen that the first peak's amplitude is used to determine what the selection threshold should be in order to qualify the second peak as a correlation peak. The principle behind this determination is that, in general, the amplitude of a second correlation peak—and any associated sidelobe peaks that it may have—are only likely to change by a small amount, relative to the first peak. In this way, the present invention uses the amplitude of the first peak that is analysed in the output signal to dynamically adjust the selection threshold for accurately determining whether or not a second peak is a correlation peak. This approach allows for a wide range of correlation peaks to be detected to improve receiver sensitivity, while maintaining robustness against false detections (e.g. sidelobe detections) as it is not necessary to make a predetermined compromise between sensitivity and selectivity. This in turn enables, for example, a lower bit correlator (e.g. 8-bit correlator) to be used in a receiver to achieve a high level of sensitivity at low receiver complexity.

The plurality of peaks in the output signal may comprise correlation peaks and void peaks (e.g. sidelobe peaks). Preferably the correlation peaks are separated in time by a fixed amount.

The selection threshold may also be referred to herein as a sidelobe threshold.

In set of embodiments a time separation between the first peak and the second peak in the plurality of peaks is calculated. In a set of such embodiments, if the time separation is not an expected value or within an expected range, the determination as to whether the amplitude of the second peak is greater than the selection threshold is made. That is, the comparison against the selection is only made when the time separation is not as expected. Conversely the second peak may be identified as a correlation peak if the time separation is as expected. This provides an advantage in accordance with embodiments of the invention over relying just on time separation since noise may make it difficult to determine the time separation accurately, making it hard to identify a correlation peak accurately. In instances where the time separation is not as expected (possibly due to noise effects), the comparison of the second peak's amplitude relative to the selection threshold provides an additional test for determining whether the second peak is a correlation peak. This provides an extra layer of robustness against false detections, and advantageously this test is less susceptible to noise effects as it is based on amplitude levels rather than time points.

Further, as the second peak is only compared to the selection threshold when the second peak is outside the expected time range from the first peak a saving in processing can be made. In turn, this may be used to provide faster synchronisation, symbol timing recovery and frequency offset correction in a receiver, while improving robustness against false detections (e.g. sidelobe detections).

The output signal from the correlator may comprise a sequence of peaks separated in time as a result of a cross-correlation between two signals. The cross-correlation may be between (i) a radio signal encoding a data stream comprising a repeated bit sequence, and (ii) a reference bit sequence. Typically the reference bit sequence is a predetermined sequence stored in the radio receiver. In a set of embodiments the reference sequence comprises some, or preferably all, of the bit sequence which is repeated.

Further, the data stream may comprise data packets or data frames in accordance with a predetermined communication protocol such as Bluetooth™, Bluetooth Low Energy™ or Bluetooth Long Range™. In a set of embodiments at least some bits in the data stream are encoded using direct-sequence-spread-spectrum-(DSSS-) encoding in which a fixed chip sequence is used to represent specific bits or bit sequences. The receiver may de-spread the received data stream after correlating the data stream.

Typically the peaks in the output signal from the correlator will be spaced apart in time by an amount corresponding to the length of repeated bit sequence In a set of embodiments a further, fixed threshold is applied to the amplitudes of the first and/or second peaks. The fixed threshold may be used to filter out at least some of the sidelobe peaks. By setting the fixed threshold suitably low, a smaller subset of peaks are analysed against the dynamic selection threshold without losing too much sensitivity.

In a set of embodiments, the dynamic selection threshold is additionally based on the fixed threshold. This has been found to provide a more accurate selection threshold for qualifying whether a second peak is a correlation peak.

In a set of embodiments, the dynamic selection threshold is calculated according to:

$$Th_{sidelobe} = \alpha_1 \cdot Q_{lastpeak} + \alpha_2 \cdot T_h$$

where $Th_{sidelobe}$ is the selection threshold, $Q_{last\ peak}$ is the amplitude of the first peak, $T_h$ is the fixed threshold, and $\alpha_1$ and $\alpha_2$ are positive combining coefficients that add to 1. This further improves the accuracy of the selection threshold for qualifying whether a second peak is a correlation peak.

In a set of embodiments the radio receiver uses the first and second peaks for symbol timing recovery or frame synchronisation, or other radio communication processes that rely on identification of correlation peaks.

Figure 1:
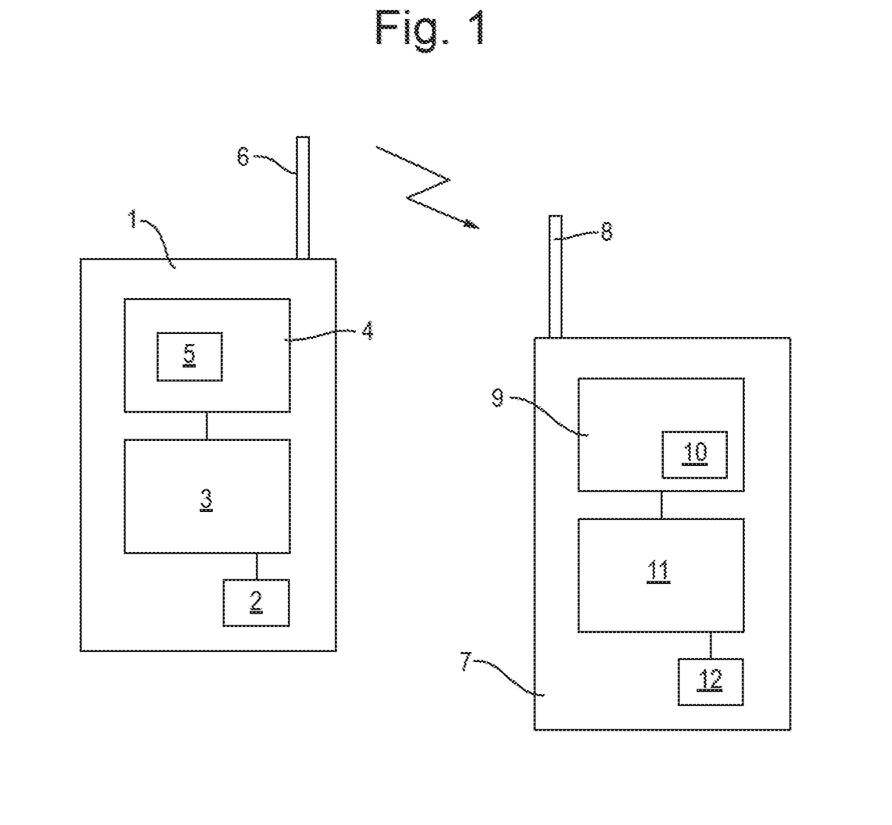
FIG. 1 is a schematic drawing of a radio communication system embodying the invention.

Certain embodiments of the invention will now be described, by way of example only, with reference to the accompanying drawings, in which:

FIG. 1 shows a wireless heart-rate monitor 1 which is in communication with a smartphone 7. Both devices embody the present invention.

The wireless heart-rate monitor 1 has a heart-rate sensor 2 which is connected to a microprocessor 3 (such as an ARM™ Cortex M-series). The microprocessor 3 is connected to a radio transmitter 4. The radio transmitter 4 includes an encoder 5 (among other components). Other conventional components, such as memory, a battery, etc. are also present, but are omitted from the drawing for the sake of simplicity. The microprocessor 3 and radio transmitter 4 may be integrated on a single silicon chip. The monitor 1 has a radio antenna 6, which may be integrated on such a chip or external to it.

The smartphone 7 has, among other conventional components (not shown), an antenna 8, suitable for receiving short-range radio communications from wireless-personal-area-network devices, which is connected to a radio receiver 9. The radio receiver 9 includes synchronization and decoding logic 10, among other components. The radio receiver 9 is connected to a microprocessor 11 (such as an ARM™ Cortex M-series), which can output data for display on a screen 12, possibly via other components, such as a further microprocessor (not shown) running an operating system and appropriate software applications.

In use, the wireless heart-rate monitor 1 receives periodic heart-rate readings for a human user from the heart-rate sensor 2. The microprocessor 3 processes the readings into a suitable format for transmission, and sends the message data to the radio transmitter 4. In some embodiments, the message data may already be differentially encoded, in order to improve the efficiency of the decoding operation on the radio receiver 9. The radio transmitter 4 determines whether the message data can fit within a single data packet, or if it must be split across two or more data packets. The encoder 5 in the radio transmitter 4 encodes the message data using a convolution-based forward-error-correcting code. It prepends a link-layer Access Address (cAA) and a rate indicator (RI) to the encoded message data to create a payload. The transmitter 4 then pre-pends a preamble comprising a synchronisation word to the payload. The synchronisation word comprises ten repetitions of a predetermined sequence, S1 [00111100] (for example). Each bit in a transmitted packet may be direct-sequence-spread-spectrum-(DSSS-) encoded using a fixed chip sequence. For example, each '1' bit might be represented by the 4-bit sequence [1 1 0 0] and each '0' bit represented by the sequence [0 0 1 1]. Of course, other lengths of chip sequence may be used, which may or may not be powers of two.

The radio transmitter 4 then transmits the encoded data packet from the antenna 6, modulated on a radio-frequency carrier (e.g. at around 2.4 GHz), using two-level GFSK with a modulation index of 0.5. Alternatively, the radio transmitter 4 may use FSK modulation.

Figure 2:
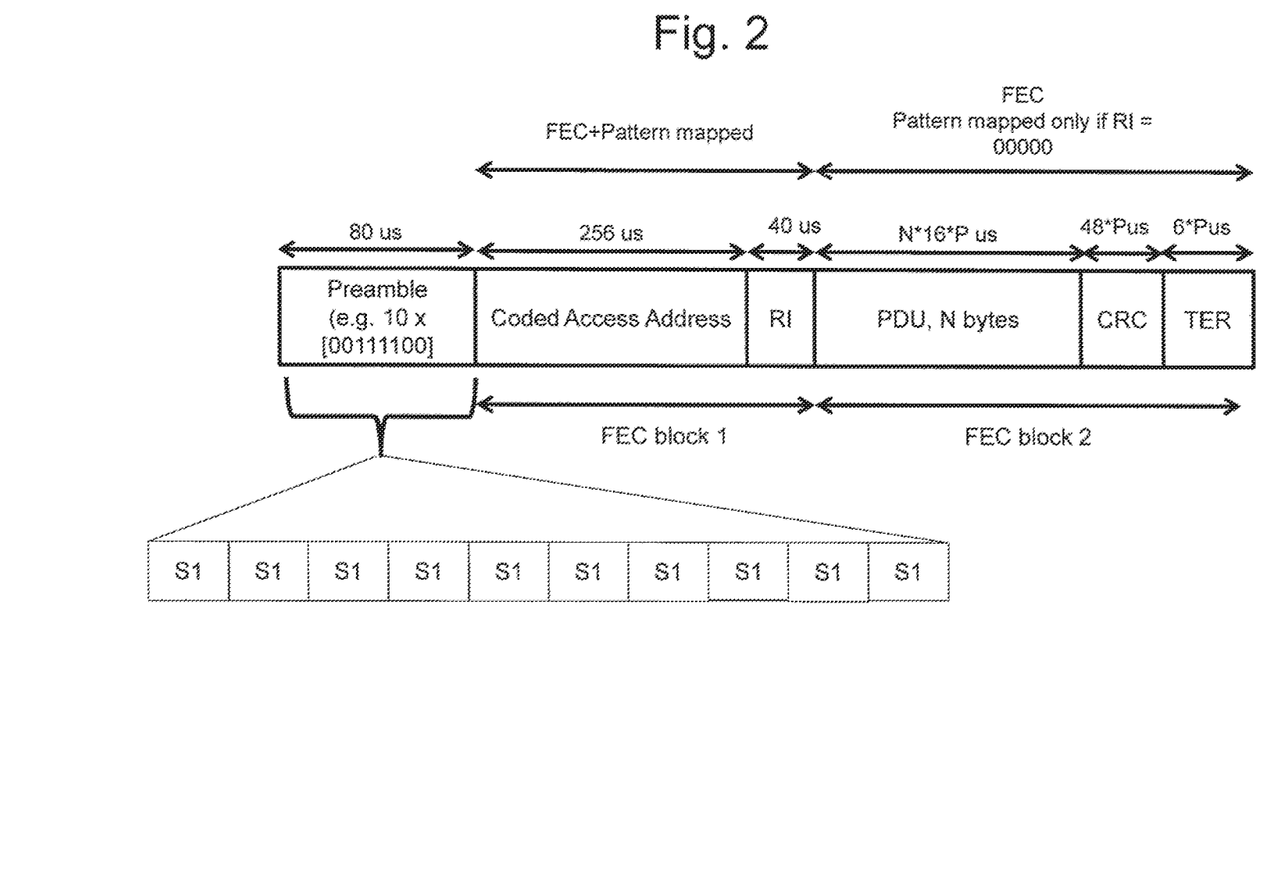
FIG. 2 is a diagram of a data packet that may be transmitted and received by the radio communication system.

FIG. 2 shows an exemplary data packet structure. The data packet structure may be arranged for Bluetooth Low Energy Long Range communications, or other types of wireless radio communications (e.g. LTE, ZigBee, and W-Fi communications). In this example the structure includes a preamble and two forward-error-corrected (FEC) blocks. The first FEB block comprises a coded access address (CAA) and a rate indicator (RI). The rate indicator contains data about the encoding of a second FEC block which itself contains a protocol data unit (PDU) (the data payload), cyclic redundancy check (CRC) bits, and termination (TER) bits—e.g. a coded version of '000'.

In use, the smartphone 7 receives the radio data packet at the antenna 8. The radio receiver 9 processes the GFSK signal using the synchronization and decoding logic 10. The receiver 9 first correlates the received signal with a stored synchronization sequence (e.g. [0 0 1 1 1 1 0 0]), in order to determine symbol timing recovery and frequency offset correction. Preferably, the stored synchronisation sequence corresponds to the predetermined sequence (i.e. S1) in the preamble.

Correlation peaks in the correlation provides timing synchronization and hence frame synchronization information which may then be used to decode the data payload. This operation is explained in more detail below.

The wireless heart-rate monitor 1 and smartphone 7 may be configured so that heart-rate message data is transferred from the wireless heart-rate monitor 1 to the smartphone 7 substantially according to the Bluetooth Low Energy (BTLE)™ core specification version 4.0, with the exception of the physical layer. The wireless heart-rate monitor 1 and mobile telephone 7 may be equipped for two-way radio communication, using corresponding components for radio transmission in the opposite direction, although this is not essential.

Figure 3:
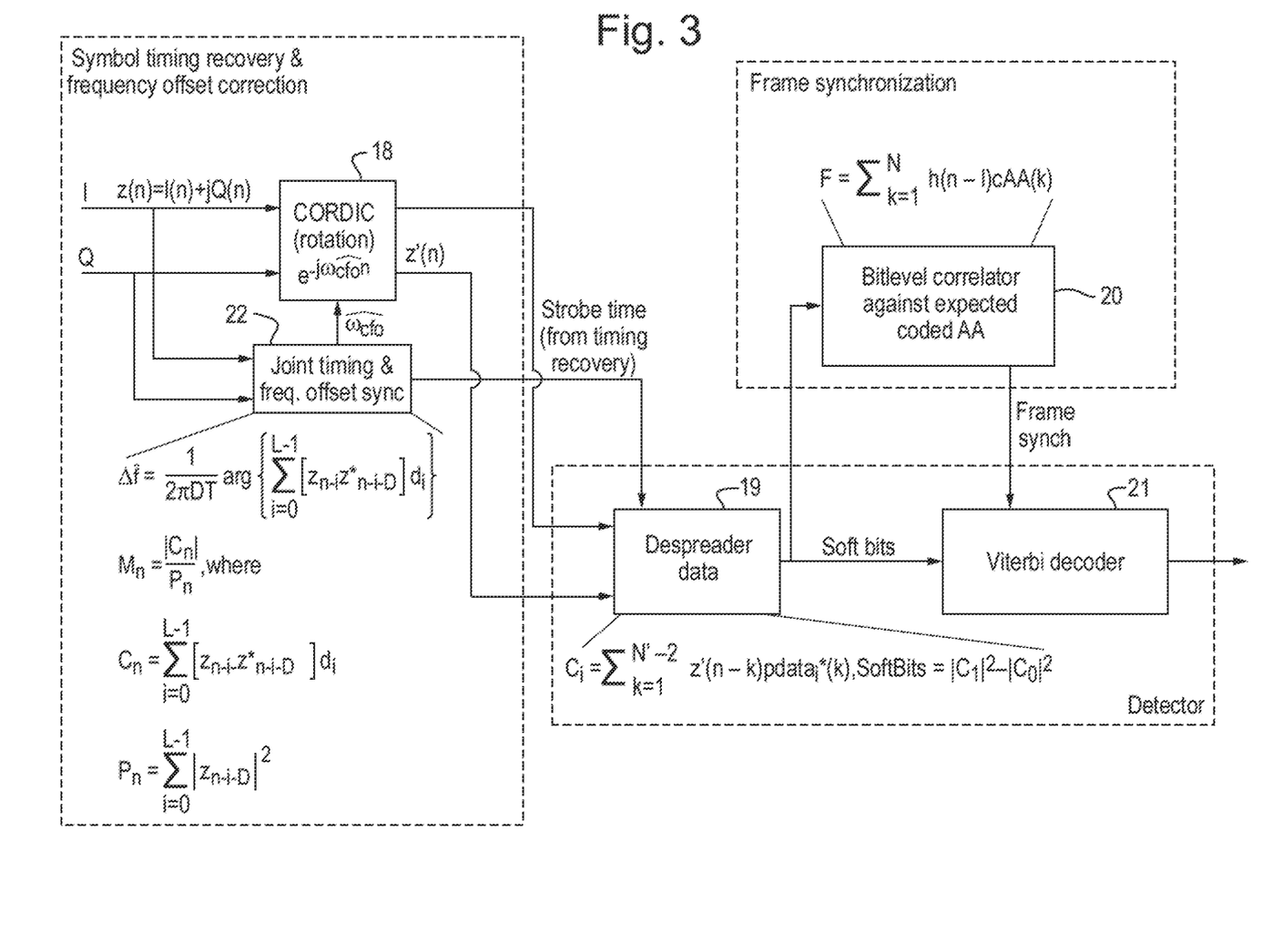
FIG. 3 is schematic drawing of part of a radio receiver embodying the invention.

FIG. 3 shows detail of a digital baseband processing stage of a radio receiver embodying the invention. This could be the same radio receiver 9 as described above, or it could be a different radio receiver.

Steps such as filtering and residual frequency offset tracking are not shown for reasons of conciseness. The design of the radio receiver aims to optimize sensitivity while tolerating realistic channel conditions (carrier frequency offset, carrier drift, fading, etc.).

Complex-valued baseband samples are shown entering from the left side of FIG. 3. These are passed to a coordinate rotation digital computer (CORDIC) unit 18, and from there to a de-spreader unit 19. The de-spreader unit 19 performs a cross-correlation between the incoming data and one or more stored chip sequences. The output of the despreader unit 19 is passed to a bit-level coded-Access-Address correlation unit 20, and then on to a Viterbi decoder unit 21. The incoming samples are also passed to a synchronization unit 22 which performs timing synchronization and initial carrier frequency offset estimation.

FIG. 3 contains the following abbreviations:
n=chip index;
m=symbol index;
z(n)=complex baseband samples;
z'(n)=carrier-frequency offset (CFO) compensated z(n);
h(n)=hard decision bits from despread data;
cAA=replica of expected coded access address;
p(k)=complex values representing the data chip sequence on the phase cylinder after FSK modulation.

The synchronization unit 22 comprises a data-aided joint timing and frequency estimator which exploits knowledge of the data in the received symbols to cancel the effect of the modulation on the estimate of a conventional delay-and-correlate type of carrier frequency offset estimator. The principle behind the synchronization is described in WO 2014/167318, by the present applicant, the entire contents of which are hereby incorporated by reference.

Because a repeated synchronization sequence is received, checks on the time domain distances between successive magnitude responses can be used (at least in part) to filter out false detections (i.e. sidelobe peaks and noise peaks) and thereby identify valid detections (i.e. correlation peaks). This means that a shorter correlator with a lower detection threshold can be used to achieve a given level of sensitivity lowering receiver complexity.

The "joint timing & freq. offset sync" synchronization unit 22 in FIG. 3 carries out the following cross-correlation for every incoming baseband sample $z_n=I(n)+jQ(n)$:

$$\Delta \hat{f} = \frac{1}{2\pi DT} \arg \left\{ \sum_{i=0}^{L-1} [z_{n-i} z^*_{n-i-D}] d_i \right\}, \quad \text{(Eq 1)}$$

where L is the number of samples representing an up-sampled "synchronization word", which is defined as a number of repetitions of the sequence S1 above; where D is a lag which is decided at design time; and where T is the sample period.

The coefficients are given as $d_i=p_i^* p_{i+D}$ where $p_i^*$ and $p_{i+D}$ are the samples constituting the up-sampled and modulated sync word bits. The correlator should be sampled at the right point in time for the frequency offset estimate to be valid, and this time instant is when a "correlation peak" is observed in the cross correlation output, $M_n$, given by:

$$M_n = \frac{|C_n|}{P_n}, \text{ where } C_n = \sum_{i=0}^{L-1} [z_{n-i} z_{n-i-D}^*] d_i \text{ and} \quad \text{(Eq 2)}$$

$$P_n = \sum_{i=0}^{L-1} |z_{n-i-D}|^2.$$

The coefficients $d_i=p_i^* p_{i+D}$ are calculated at design time.

Figure 4:
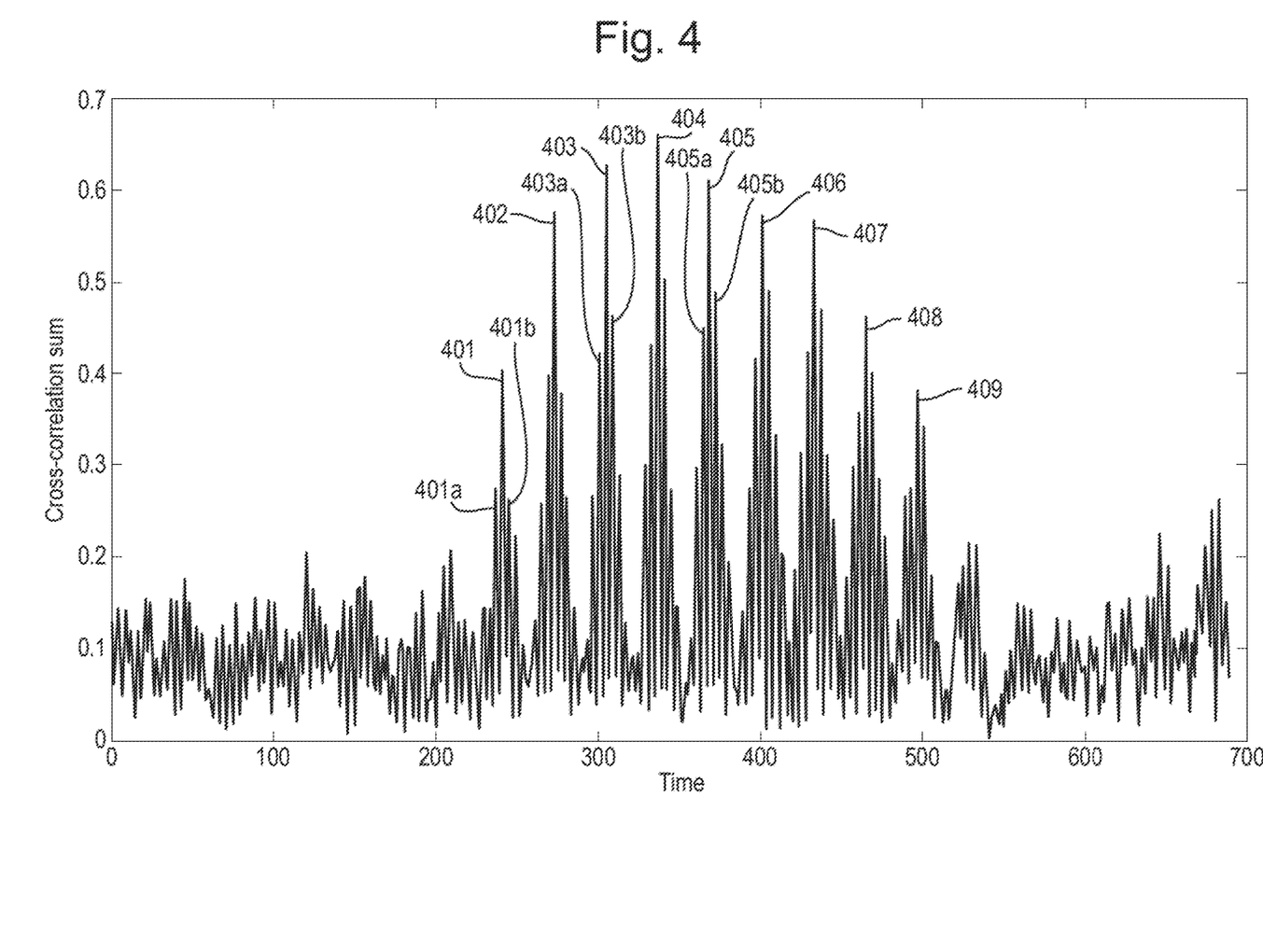
FIG. 4 shows an example of a cross-correlation output generated by a radio receiver embodying the invention.

An example of a normalised cross-correlation output as a function of time is given in FIG. 4. The cross-correlation output comprises several correlation peaks 401-409 corresponding to correlating each instance of the repeated "sync word" and therefore spaced apart in time by amounts corresponding to the length of the sync word (within a range of error Δ, e.g. +/−1 sample index, which accounts for variations due to noise). The cross-correlation output also comprises several sidelobe peaks (e.g. 401a-b, 403a-b, 405a-b) located either side of each correlation peak. It will be appreciated that only some of the sidelobe peaks are labelled in FIG. 4 for conciseness. The sidelobe peaks may arise when, for example, the start of a stored sequence in the correlator does not occur at the start of a sampled sequence. In this case, there is a time offset between the stored sequence and sampled sequence, and as such, only some of the sampled sequence may match with the stored sequence.

The synchronization unit 22 determines a correlation peak in the cross-correlation output based on a variable sidelobe threshold check. The sidelobe threshold check is applied to one or more neighbouring pairs of peaks in the cross-correlation output. The check determines whether the latter peak of two neighbouring peaks (i.e. second peak—e.g. peak 403) in the cross-correlation output exceeds a calculated dynamic sidelobe threshold. The calculation of the dynamic sidelobe threshold is based on the amplitude of the earlier peak in the pair of neighbouring peaks (i.e. the first peak—e.g. peak 402). An example of how a correlation peak is determined using the variable sidelobe threshold check is discussed in more detail below with reference to FIG. 5.

A further, fixed threshold (e.g. 0.4) is used as a first check to identify potential correlation peaks in the cross-correlation output and to filter out noise. The threshold is chosen so that all the genuine correlation peaks are expected to exceed it. This stage of filtering should result in most of the correlation peaks remaining along, probably, with some false peaks such as sidelobe peaks. For example, a programmable threshold of 0.4 may be applied to the cross-correlation output of FIG. 4 to remove all of the peaks and noise below 0.4 and thereby yield correlation peaks 401-408 and any sidelobe peaks that have amplitudes exceeding 0.4 (e.g. 403a-b and 405a-b).

The dynamic sidelobe threshold check is applied only when a peak is spaced outside an expected range from the previous peak, the expected range being the sync word length, plus or minus an error margin, Δ, to account for noise.

The calculation of the sidelobe threshold ($Th_{sidelobe}$) may be given by:

$$Th_{sidelobe} = \alpha_1 \cdot Q_{lastpeak} + \alpha_2 \cdot T_h \quad \text{(Eq 3)}$$

where $Q_{last\ peak}$ is the amplitude of the first peak in the currently analysed neighbouring pair of peaks, $T_h$ is the predetermined threshold, and $\alpha_1$ and $\alpha_2$ are positive combining coefficients that add to 1.

The repeated synchronization sequence together with the variable sidelobe threshold check have the advantage that the synchronization logic 10 can filter out sidelobe peaks (or rather qualify a correlation peak) based on the amplitude of an earlier neighbouring peak, which gives a more accurate prediction of the likely amplitude of the next peak than an arbitrarily chose fixed threshold. Since the sidelobe threshold is dynamic it is increased or decreased to adjust for changes in the amplitude of correlation peaks in the correlation output. This allows a wider range of correlation peaks to be detected to improve receiver sensitivity, while maintaining robustness against false detections (e.g. sidelobe detections). This in turn means that, for example, an 8-bit correlator can be used to achieve a high level of sensitivity at low receiver complexity.

Another advantage of this pulse train synchronization is that, if a correlator frame longer than the repeat sequence is used, as may be the case in some embodiments, the receiver correlator coefficients will also be a repeated sequence. This simplifies the implementation of longer correlators, while maintaining their basic noise averaging qualities.

The process outlined above will now be described in more detail.

Referring back to FIG. 3, the carrier frequency offset (CFO) compensated sequence of complex baseband samples z'(n) is processed by the digital-baseband-correlator despreader unit 19. This calculates $C_i = \sum_{k=1}^{N'-2} z'(n-k) pdata_i^*(k)$ and outputs real-valued $SoftBits = |C_1|^2 - |C_0|^2$ to the bit-level coded-Access-Address correlation unit 20 and to the Viterbi decoder unit 21.

The coded-Access-Address correlation unit 20 performs a correlation operation $F = \sum_{k=1}^{N} h(n-k) cAA(k)$ using a stored version of the coded Access Address, in order to determine the frame synchronization for the incoming data frame.

The message data bits are then determined by the Viterbi decoder unit 21, which operates in a conventional manner.

Figure 5:
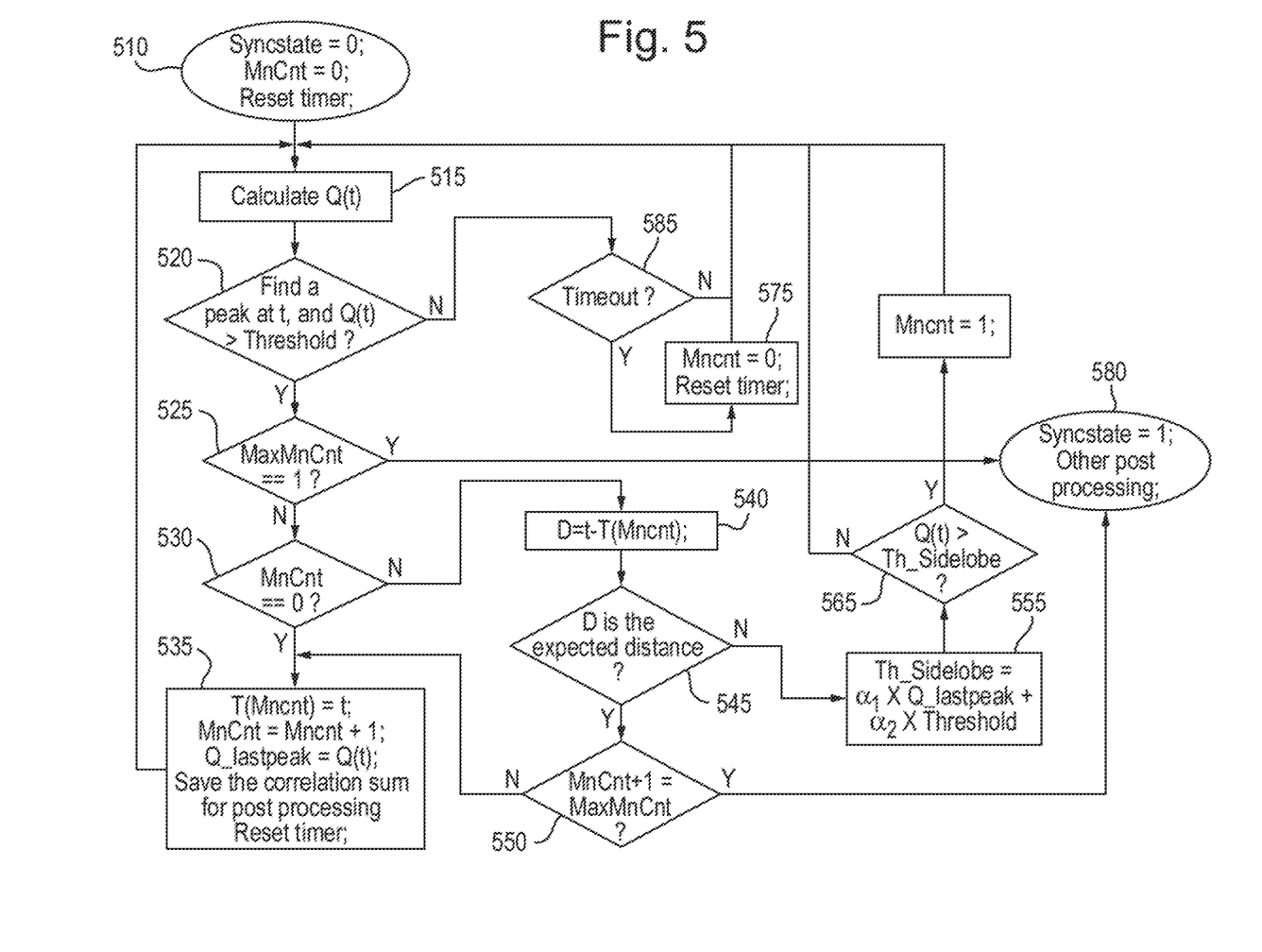
FIG. 5 is a state diagram for a radio receiver in accordance with the invention.

FIG. 5 shows a finite state machine (FSM) that can orchestrate the correlation peak detection process (which may be carried out in synchronization unit 22 of FIG. 3) in a radio receiver as illustrated in FIG. 3.

The state of this FSM is given by the variable syncstate. At block 510, the FSM receives a cross-correlation output and starts out in syncstate=0, time t=0, and MnCnt=0. Syncstate=0 indicates that the FSM has not yet found the required number of correlation peaks for processes such as symbol timing recovery and frame synchronisation. MnCnt is a counter which counts the number of correlation peaks that are determined to have amplitudes that exceed a predetermined threshold and a sidelobe threshold, and to have a certain time separation from an earlier neighbouring correlation peak. When a sufficient minimum number MaxMnCnt of correlation peaks has been determined, the syncstate is set to one at block 580 and the receiver may then use the timings of the determined correlation peaks for processes such as timing and carrier frequency offset synchronization and frame synchronization.

At processing block 515, the FSM selects one peak in the received cross-correlation output for analysis. At this stage, it is not yet determined whether the selected peak is a correlation peak or a false peak (e.g. sidelobe peak). The peaks are selected in order of the time they occurred with the earliest peak being selected first and the most recent peak being selected last. The selected peak is passed to decision block 520.

At decision block 520, the FSM determines whether the amplitude of the selected peak exceeds a threshold, $T_h$. The threshold $T_h$ is fixed and is preprogramed into the FSM. Preferably, the threshold $T_h$ is kept low enough so that the respective amplitudes of at least most of the correlation peaks exceed the threshold $T_h$. It will be appreciated that the application of this threshold may filter out some of the sidelobe peaks. However, as a consequence of keeping $T_h$ low enough so that most of the correlation peaks are detected, there may be a portion of sidelobe peaks that pass this threshold test (i.e. there may be a portion of sidelobes that have amplitudes that exceed threshold $T_h$).

If the selected peak is found to exceed threshold $T_h$, the FSM notes the time at which the peak occurred and passes the selected peak to block 525 for further processing and tests. If the amplitude of the selected peak does not exceed threshold $T_h$, the FSM proceeds to decision block 585 where it determines whether or not a timeout has occurred. Provided that a timeout hasn't occurred, the FSM is configured to return to block 515 to select the next peak in the cross-correlation output for evaluation. If a timeout has occurred, the FSM proceeds to block 575 to reset the timer and MnCnt.

At decision block 525, the FSM determines whether the minimum number MaxMnCnt of correlation peaks has been determined.

Decision block 530 evaluates whether or not MnCnt equals zero. When MnCnt equals zero, the selected peak is labelled and processed as a "first" peak, and when MnCnt does not equal zero the selected peak is labelled and processed as a "second" peak. First peaks are passed to processing block 535 and second peaks are passed to processing block 540.

Each time a peak is passed to block 535 (which may be from either block 530 or block 550), it stores the time at which the peak occurred as T(MnCnt), increments MnCnt by one, and the time separation period between the "first" peak and the "second" peak. $Q_{lastpeak}$ is used for determining the sidelobe threshold at block 555. The stored values may additionally be used for processes such as timing and carrier frequency offset synchronization and frame synchronization.

At block 540, the FSM determines the time at which the "second" peak occurred and then calculates the time separation period (i.e. D=t−T(Mncnt)) between the "first" and the "second" correlation peaks.

Decision block 545 then evaluates whether or not the first and the second peaks are spaced apart in time by amounts corresponding to the "sync word" length within the error margin 4, to account for noise. If they are separated by this amount, MnCnt is incremented by one and then evaluated at block 550 to determine whether or not the minimum number MaxMnCnt of correlation peaks has been found. When the minimum number MaxMnCnt of correlation peaks has yet to be found, the "second" peak is passed to block 535 to be labelled and processed as a "first" peak. That is, the "second" peak is then considered to be the "first" peak for analysis of the next peak selected by block 515. On the other hand, when the minimum number MaxMnCnt of correlation peaks has been found, the FSM proceeds to block 580.

If the first peak and the second peak are not spaced apart in time by amounts corresponding to the "sync word" length, plus or minus Δ, block 555 then calculates a sidelobe threshold $Th_{sidelobe}$ using equation (Eq 3) above, the value of $T_h$, and $Q_{lastpeak}$ from block 535.

At decision block 565, the second peak is evaluated to determine whether or not it is a correlation peak or a false peak (e.g. sidelobe peak). This is done by determining whether or not the amplitude of the "second" peak exceeds the calculated sidelobe threshold $Th_{sidelobe}$ from block 555. If the "second" peak exceeds the calculated sidelobe threshold $Th_{sidelobe}$, the second peak is determined to be a correlation peak and the FSM then proceeds to set MnCnt equal to one and select the next peak in the cross-correlation output for evaluation at block 515. On the other hand, if the "second" peak does not exceed the calculated sidelobe threshold $Th_{sidelobe}$, the second peak is determined to be a false peak and the FSM then proceeds to block 515 without changing MnCnt or the timer.

The methods herein may be repeated to fine tune the determination of the correlation peaks and thereby fine tune subsequent processes such as timing and carrier frequency offset synchronization and frame synchronization. The iteration(s) may be based on the same data packet that was used in the first iteration of the method or, alternatively, on a different data packet received by the receiver. It will be appreciated that iteration(s) improve the synchronisation accuracy.

The iteration(s) (e.g. second iteration) of a method in accordance with the present invention may use a different threshold $T_h$ than in a preceding iteration (e.g. first iteration). Preferably, a lower threshold $T_h$ is used in each subsequent iteration to improve the sensitivity of the receiver.

It will be appreciated by those skilled in the art that whilst various specific features have been used to exemplify the invention, these are not limiting and many modifications and variations may be made without departing from the scope of the invention.

The invention claimed is:

1. A method of operating a digital radio receiver comprising:
   receiving a radio signal;
   passing said radio signal to a correlator for correlating said radio signal with a predetermined pattern to provide an output signal comprising a plurality of peaks separated in time;
   determining an amplitude of a first peak in the plurality of peaks;
   calculating a selection threshold based on said first peak amplitude;
   determining an amplitude of a second peak in the plurality of peaks;
   calculating a time separation between the first peak and the second peak;
   determining if the time separation is an expected value or within an expected range;
   if the time separation is an expected value or within an expected range, identifying the second peak as a correlation peak;
   if the time separation is not an expected value or not within an expected range, comparing said second peak amplitude to the selection threshold based on said first peak amplitude; and identifying the second peak as a correlation peak if the second peak amplitude is greater than the selection threshold.

2. The method as claimed in claim 1 further comprising additionally applying a fixed threshold to the amplitudes of the first and/or second peaks.

3. The method as claimed in claim 2, wherein the selection threshold is additionally based on the fixed threshold.

4. The method as claimed in claim 3, wherein the selection threshold is calculated according to:

$$Th_{sidelobe} = \alpha_1 \cdot Q_{lastpeak} + \alpha_2 \cdot T_h$$

where $Th_{sidelobe}$ is the selection threshold, $Q_{last\ peak}$ is the amplitude of the first peak, $T_h$ is the fixed threshold, and $\alpha_1$ and $\alpha_2$ are positive combining coefficients that add to 1.

5. The method as claimed in claim 1, wherein the radio signal encodes a data stream comprising a repeated bit sequence, and the correlator cross-correlates the radio signal with a reference bit sequence to provide an output signal comprising a sequence of peaks separated in time.

6. The method as claimed in claim 5, wherein the peaks in the output signal from the correlator are spaced apart in time by an amount corresponding to a length of the repeated bit sequence.

7. The method as claimed in claim 5, wherein the reference bit sequence comprises some or all of the repeated bit sequence.

8. The method as claimed in claim 5, wherein the reference bit sequence is a predetermined sequence stored in the radio receiver.

9. The method as claimed in claim 5, wherein at least some bits in the data stream are encoded using direct-sequence-spread-spectrum-(DSSS-) encoding in which a fixed chip sequence is used to represent specific bits or bit sequences.

10. The method as claimed in claim 5, further comprising de-spreading the received data stream after correlating the data stream.

11. The method as claimed in claim 1 further comprising using the first and second peaks for symbol timing recovery or frame synchronisation.

12. An apparatus comprising a digital radio receiver for receiving a radio signal, and a correlator for correlating the radio signal with a predetermined pattern to provide an output signal comprising a plurality of peaks separated in time, the digital radio receiver arranged to:
pass said radio signal to the correlator to produce an output signal comprising a plurality of peaks separated in time;
determine an amplitude of a first peak in the plurality of peaks;
calculate a selection threshold based on said first peak amplitude;
determine an amplitude of a second peak in the plurality of peaks;
calculate a time separation between the first peak and the second peak in the plurality of peaks;
determine if the time separation is an expected value or within an expected range;
if the time separation is an expected value or within an expected range, identify the second peak as a correlation peak;
if the time separation is not an expected value or not within an expected range, compare said second peak amplitude to the selection threshold based on said first peak amplitude; and identify the second peak as a correlation peak if the second peak amplitude is greater than the selection threshold.

13. The apparatus as claimed in claim 12 further arranged to additionally apply a fixed threshold to the amplitudes of the first and/or second peaks.

14. The apparatus as claimed in claim 13, wherein the selection threshold is additionally based on the fixed threshold.

15. The apparatus as claimed in claim 14, wherein the selection threshold is calculated according to:

$$Th_{sidelobe} = \alpha_1 \cdot Q_{lastpeak} + \alpha_2 \cdot T_h$$

where $Th_{sidelobe}$ is the selection threshold, $Q_{last\ peak}$ is the amplitude of the first peak, $T_h$ is the fixed threshold, and $\alpha_1$ and $\alpha_2$ are positive combining coefficients that add to 1.

16. The apparatus as claimed in claim 12, wherein the radio signal encodes a data stream comprising a repeated bit sequence, and the correlator is arranged to cross-correlate the radio signal with a reference bit sequence to provide an output signal comprising a sequence of peaks separated in time.

17. The apparatus as claimed in claim 16, wherein the peaks in the output signal from the correlator are spaced apart in time by an amount corresponding to a length of the repeated bit sequence.

18. The apparatus as claimed in claim 16, wherein the reference bit sequence comprises some or all of the repeated bit sequence.

19. The apparatus as claimed in claim 16, wherein the reference bit sequence is a predetermined sequence stored in the radio receiver.

20. The apparatus as claimed in claim 16, wherein at least some bits in the data stream are encoded using direct-sequence-spread-spectrum-(DSSS-) encoding in which a fixed chip sequence is used to represent specific bits or bit sequences.

21. The apparatus as claimed in claim 16, wherein the digital radio receiver is further arranged to de-spread the received data stream after correlating the data stream.

22. The apparatus according to claim 12, wherein the digital radio receiver is further arranged to use the first and second peaks for symbol timing recovery or frame synchronisation.

23. A non-transitory computer readable medium comprising software, when run on a data processing apparatus, to cause the data processing apparatus to:
receive a radio signal from a digital radio receiver;
correlate said radio signal with a predetermined pattern to provide an output signal comprising a plurality of peaks separated in time;
determine an amplitude of a first peak in the plurality of peaks;
calculate a selection threshold based on said first peak amplitude;
determine an amplitude of a second peak in the plurality of peaks;
calculate a time separation between the first peak and the second peak in the plurality of peaks;
determine if the time separation is an expected value or within an expected range;
if the time separation is an expected value or within an expected range, identify the second peak as a correlation peak;

if the time separation is not an expected value or not within an expected range, compare said second peak amplitude to the selection threshold based on said first peak amplitude; and identify the second peak as a correlation peak if the second peak amplitude is greater than the selection threshold.

\* \* \* \* \*